United States Patent
Yan et al.

(10) Patent No.: US 9,264,214 B2
(45) Date of Patent: Feb. 16, 2016

(54) PHASE DETECTION METHOD AND APPARATUS FOR CLOCK RECOVERY

(71) Applicant: Fujitsu Limited, Kawasaki (JP)

(72) Inventors: Meng Yan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 14/048,815

(22) Filed: Oct. 8, 2013

(65) Prior Publication Data

US 2014/0105616 A1    Apr. 17, 2014

(30) Foreign Application Priority Data

Oct. 8, 2012 (CN) .......................... 2012 1 0377022

(51) Int. Cl.
*H04B 10/40* (2013.01)
*H04B 10/66* (2013.01)
*H04L 7/00* (2006.01)
*H04L 7/033* (2006.01)

(52) U.S. Cl.
CPC .............. *H04L 7/0075* (2013.01); *H04L 7/033* (2013.01); *H04B 10/40* (2013.01); *H04B 10/66* (2013.01)

(58) Field of Classification Search
None
See application file for complete search history.

(56) References Cited

U.S. PATENT DOCUMENTS

| | | | |
|---|---|---|---|
| 6,259,755 B1 * | 7/2001 | O'Sullivan et al. | 375/376 |
| 7,586,335 B2 | 9/2009 | Werker et al. | |
| 2004/0223567 A1 * | 11/2004 | Liu | 375/355 |
| 2006/0017472 A1 | 1/2006 | Adkisson | |
| 2012/0076491 A1 | 3/2012 | Yan et al. | |
| 2013/0034352 A1 | 2/2013 | Liu | |
| 2014/0029959 A1 | 1/2014 | Koizumi et al. | |

FOREIGN PATENT DOCUMENTS

| | | |
|---|---|---|
| CN | 101820340 | 9/2010 |
| CN | 101931469 | 12/2010 |
| CN | 102326344 | 1/2012 |
| CN | 102420658 | 4/2012 |

OTHER PUBLICATIONS

Chinese Office Action dated Oct. 9, 2015 in corresponding Chinese Patent Application No. 201210377022.0.

* cited by examiner

*Primary Examiner* — Darren E Wolf
(74) *Attorney, Agent, or Firm* — Staas & Halsey LLP

(57) ABSTRACT

Embodiments of the present invention provide a phase detection method and apparatus. The apparatus comprises a phase detector, the phase detector comprising a calculation unit configured to calculate a phase difference according to a product of receiving power at different moments, so as to perform clock recovery by using the phase difference; wherein the receiving power is that obtained in sampling input signals at a predefined sampling rate, the predefined sampling rate being 2 times of a symbol rate. With the method and apparatus of the embodiments of the present invention, the problem that in case of a relatively large frequency difference or line width, or the transmitted signals are Nyquist signals of spectral widths close to the symbol rate, a conventional phase detection method will be invalid, is solved by calculating a phase difference only according to a product of receiving power at different moments.

9 Claims, 4 Drawing Sheets

PHASE DETECTION METHOD AND APPARATUS FOR CLOCK RECOVERY

CROSS REFERENCE TO RELATED APPLICATIONS

This application claims the benefit of Chinese Application No. 201210377022.0, filed Oct. 8, 2012, the disclosure of which is incorporated herein by reference.

TECHNICAL FIELD

The present invention relates to a field of optical communication technology, and in particular to a phase detection method and phase detector for clock recovery, a clock recovery apparatus containing the phase detector and a coherent optical receiver containing the clock recovery apparatus.

BACKGROUND ART

In a communication system, signals of the transmitting end reach the receiving end after being transmitted via channels. In this process, the waveforms of the signals have been seriously distorted. At the receiving end, transmitted data cannot be obtained if no processing is performed. In a practical receiver, clock and data recovery (CDR) is needed, wherein, the object of clock recovery (CR) is to generate a clock signal at the present locality, the frequency and phase of the clock signal being in consistence with the frequency and phase of the symbol changes of a received signal.

FIGS. 1 and 2 are schematic diagrams of a coherent optical communication system. At the receiving end, the received optical signals are mixed with a local oscillator laser, a coherent detector converts optical signals into electrical signals, and an analog-digital converter (ADC) performs sampling and quantization on the electrical signals to convert them into digital signals.

In FIG. 1, the output of a voltage controlled oscillator (VCO) is used to drive the ADC to perform the sampling, and a coherent optical communication system often requires that the sampling rate of an ADC is two times of the symbol rate. The output of the VCO is a local clock signal. The phase (frequency) of an output signal of the VCO is controlled by an externally applied voltage. And the output of the phase detector is applied to the VCO to control the phase of the output signal of the VCO, thereby controlling the sampling phase of the ADC. In this embodiment, the clock recovery module comprises a phase detector and a voltage controlled oscillator. As waveforms of signals will be distorted due to dispersion when optical signals are transmitted via optical channel, and the waveforms of the signals will be seriously distorted if the dispersion is very large and the clock recovery will fail, a dispersion compensator is arranged after the ADC, which compensates for most of the accumulated dispersion, making the clock recovery succeeded. Refer to document [2] for the arrangement of the dispersion compensator. The dispersion compensated signals enter into the clock recovery module and into the data recovery module. The clock recovery module (the frame in dotted lines) comprises a phase detector and a voltage controlled oscillator. And the data recovery module comprises a series of digital signal processing (such as adaptive equalization, and phase recovery, etc.), which finally recovers the transmitted data. Correct data recovery requires that the sampling frequency and phase of the ADC are in consistence with the frequency and phase of the symbol changes of a signal, which is ensured by the clock recovery.

FIG. 2 is another embodiment of the coherent optical communication system. Different from FIG. 1, in the coherent optical communication system shown in FIG. 2, the ADC is not drove by a VCO but by a free oscillator. After the ADC, the digital signals are resampled. As the resampling may equivalently introduce arbitrary delay, and the size of the introduced delay is controlled by the output signals of the phase detector, it may be equivalent to adjustment of a sampling moment. The clock recovery module in this embodiment comprises a phase detector and a resampler.

Both embodiments shown in FIGS. 1 and 2 use a phase detector, which is a key module in clock recovery. It indicates whether the current sampling phase (moment) advances or lags behind the phase of symbol changes, and according to this, the sampling phase may be directionally adjusted. In FIG. 1, the phase of the output signals of the VCO may be adjusted according to the phase difference, thereby directly adjusting the sampling moment of the ADC; and in FIG. 2, the delay introduced by the resampling module may be adjusted according to the phase difference, thereby equivalently adjusting the sampling moment. A commonly-used method of a phase detector is the Gardner method, which calculates respectively the phase differences of the I component and Q component of a received signal.

However, in the implementation of the present invention, the inventors found that certain limitations exist in the Gardner method. On the one hand, in a coherent optical communication system, there exists a certain frequency difference between the local oscillator laser of the receiving end and the laser of the transmitting end, and both of them have a respective line width. In case of no phase recovery, the actual I component and Q component cannot be obtained from a received signal. Therefore, the Gardner method will be invalid when there is a relatively large frequency difference or line width. And on the other hand, an optical communication system of a higher capacity of the next generation will employ Nyquist signals of higher spectral efficiency. Nyquist signals are signals with strictly-limited bandwidths, and their spectra are strictly limited to an interval $[-B(1+\alpha)/2, B(1+\alpha)/2]$. Where, B is a symbol rate, and $\alpha$ is referred to as a roll-off factor. For a Nyquist signal of a spectral width close to the symbol rate (with a very small roll-off factor $\alpha$), the Gardner method will be invalid even if there is no frequency difference.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

Embodiments of the present invention provide a phase detection method and apparatus, so as to solve the problem that in case of a relatively large frequency difference or line width, or the transmitted signals are Nyquist signals of spectral widths close to the symbol rate (the spectral roll-off factor is very small), a conventional phase detection method will be invalid.

According to a first aspect of the embodiments of the present invention, there is provided a phase detector, comprising:

a calculation unit configured to calculate a phase difference according to a product of receiving power at different moments, so as to perform clock recovery by using the phase difference;

wherein the receiving power is that obtained in sampling input signals at a predefined sampling rate, the predefined sampling rate being 2 times of a symbol rate.

According to a second aspect of the embodiments of the present invention, there is provided a clock recovery apparatus, comprising:

a voltage controlled oscillator configured to drive an analog-digital converter for sampling; and a phase detector as described in the first aspect, connected to the voltage controlled oscillator and configured to detect a phase difference.

According to a third aspect of the embodiments of the present invention, there is provided a single-polarization digital coherent receiver, comprising:

a coherent detector configured to convert a received optical signal into an electrical signal;

an analog-digital converter connected to the coherent detector and configured to perform analog-digital conversion to an Ith component and Qth component of the received signal outputted by the coherent detector;

a dispersion compensator connected to the analog-digital converter and configured to perform dispersion compensation to the received signal outputted by the analog-digital converter;

a data recovery apparatus connected to the dispersion compensator and configured to perform data recovery to the received signal to which dispersion compensation has been performed by the dispersion compensator; and a clock recovery apparatus as described in the second aspect, the voltage controlled oscillator of which being further connected to the analog-digital converter and configured to drive the analog-digital converter for sampling, the phase detector of which being further connected to the dispersion compensator and configured to detect a phase difference, and the clock recovery apparatus being configured to perform clock recovery.

According to a fourth aspect of the embodiments of the present invention, there is provided a dual-polarization digital coherent receiver, comprising:

a coherent detector configured to convert a received optical signal into an electrical signal;

an analog-digital converter connected to the coherent detector and configured to perform analog-digital conversion to an Ith component and Qth component of the received signal at x polarization state and the Ith component and Qth component of the received signal at y polarization state outputted by the coherent detector;

a dispersion compensator connected to the analog-digital converter and configured to perform dispersion compensation respectively to the received signals at x polarization state and y polarization state outputted by the analog-digital converter;

a data recovery apparatus connected to the dispersion compensator and configured to perform data recovery to the received signals at x polarization state and y polarization state to which dispersion compensation has been performed by the dispersion compensator; and a clock recovery apparatus as described in the second aspect, the voltage controlled oscillator of which being further connected to the analog-digital converter, the phase detector of which being further connected to the dispersion compensator, and the clock recovery apparatus being configured to perform clock recovery.

According to a fifth aspect of the embodiments of the present invention, there is provided a clock recovery apparatus, comprising:

a resampler configured to resample a received signal; and a phase detector as described in the first aspect, connected to the resampler and configured to detect a phase difference.

According to a sixth aspect of the embodiments of the present invention, there is provided another single-polarization digital coherent receiver, comprising:

a coherent detector configured to convert a received optical signal into an electrical signal;

an analog-digital converter connected to the coherent detector and configured to perform analog-digital conversion to an Ith component and Qth component of the received signal outputted by the coherent detector;

an oscillator connected to the analog-digital converter and configured to drive the analog-digital converter for sampling;

a clock recovery apparatus as described in the fifth aspect, connected to the analog-digital converter and configured to perform clock recovery;

a dispersion compensator connected to the clock recovery apparatus and configured to perform dispersion compensation to the received signal outputted by the analog-digital converter; and a data recovery apparatus connected to the dispersion compensator and configured to perform data recovery to the received signal to which dispersion compensation has been performed by the dispersion compensator;

wherein a resampler of the clock recovery apparatus is disposed between the analog-digital converter and the dispersion compensator and configured to resample a received signal, and a phase detector of the clock recovery apparatus is further connected to the dispersion compensator and configured to detect a phase difference.

According to a seventh aspect of the embodiments of the present invention, there is provided another dual-polarization digital coherent receiver, comprising:

a coherent detector configured to convert a received optical signal into an electrical signal;

an analog-digital converter connected to the coherent detector and configured to perform analog-digital conversion to an Ith component and Qth component of the received signal at x polarization state and the Ith component and Qth component of the received signal at y polarization state outputted by the coherent detector;

an oscillator connected to the analog-digital converter and configured to drive the analog-digital converter for sampling;

a clock recovery apparatus as described in the fifth aspect, connected to the analog-digital converter and configured to perform clock recovery;

a dispersion compensator connected to the clock recovery apparatus and configured to perform dispersion compensation respectively to the received signals at x polarization state and y polarization state outputted by the analog-digital converter; and a data recovery apparatus connected to the dispersion compensator and configured to perform data recovery to the received signals at x polarization state and y polarization state to which dispersion compensation has been performed by the dispersion compensator;

wherein a resampler of the clock recovery apparatus is disposed between the analog-digital converter and the dispersion compensator and configured to resample a received signal, and a phase detector of the clock recovery apparatus is further connected to the dispersion compensator and configured to detect a phase difference.

The advantage of the embodiments of the present invention exists in that the problem that in case of a relatively large frequency difference or line width, or the transmitted signals are Nyquist signals of spectral widths close to the symbol rate, a conventional phase detection method will be invalid, is solved by calculating a phase difference only according to a product of receiving power at different moments.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be enlarged or reduced. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE INVENTION

Figure 1:
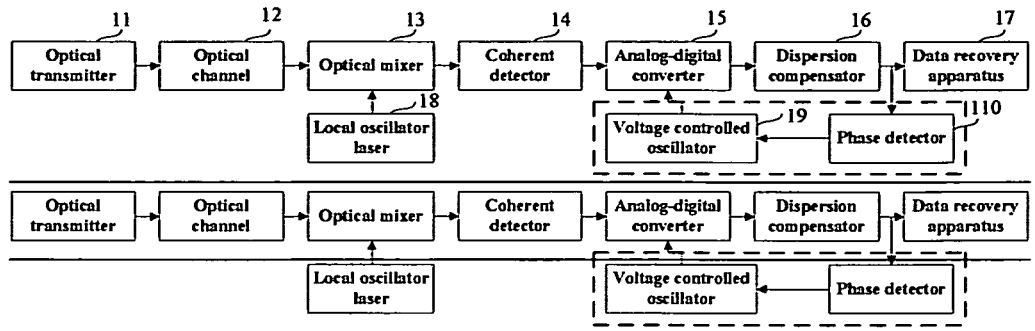
FIG. 1 is a schematic diagram of the composition of a coherent optical communication system in which the output of a voltage controlled oscillator is used to drive an ADC for sampling.
Figure 2:
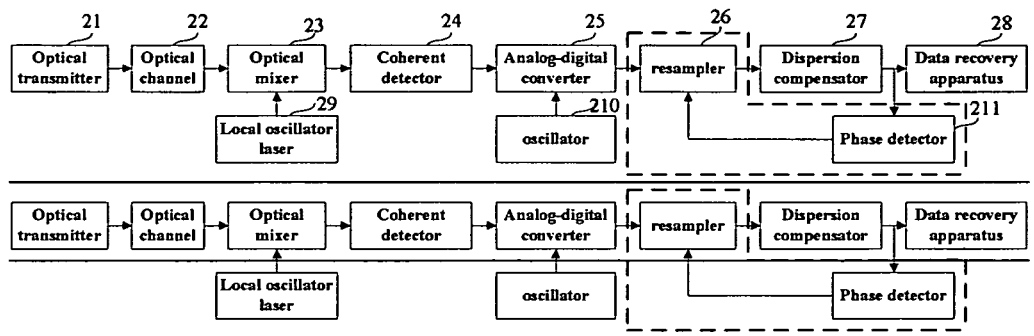
FIG. 2 is a schematic diagram of the composition of a coherent optical communication system in which a free oscillator is used to drive an ADC for sampling.

The foregoing and other features of the embodiments of the present invention will become apparent with reference to the drawings and the following description. These embodiments are illustrative only and are not intended to limit the present invention. For easy understanding of the principle and embodiment of the present invention by those skilled in the art, the principle of the embodiments of the present invention shall be described taking the coherent optical receiving system shown in FIG. 1 as an example. As shown in FIG. 1, the system includes an optical transmitter 11, an optical channel 12, an optical mixer 13, a coherent detector 14, an analog-digital converter 15, a dispersion compensator 16, a data recovery apparatus 17, a local oscillator laser 18, a votage controlled oscillator 19, and a phase detector 110. However, it should be understood that the embodiments of the present invention are not limited to the coherent optical communication system shown in FIG. 1. For example, the contents of the embodiments of the present invention are also applicable to the coherent optical communication system shown in FIG. 2. As shown in FIG. 2, the system includes an optical transmitter 21, an optical channel 22, an optical mixer 23, a coherent detector 24, an analog-digital converter 25, a resampler 26, a dispersion compensator 27, a data recovery apparatus 28, a local oscillator laser 29, an oscillator 210, and a phase detector 211. And FIGS. 1 and 2 show a single-polarization coherent optical communication system, and there are dual-polarization coherent optical communication systems corresponding respectively to FIGS. 1 and 2. The functions of the contents of the embodiments of the present invention are the same for the single-polarization coherent optical communication system shown in FIGS. 1 and 2 and the dual-polarization coherent optical communication systems corresponding to FIGS. 1 and 2.

The preferred embodiments of the present invention are described as follows with reference to the drawings.

Embodiment 1

Figure 3:
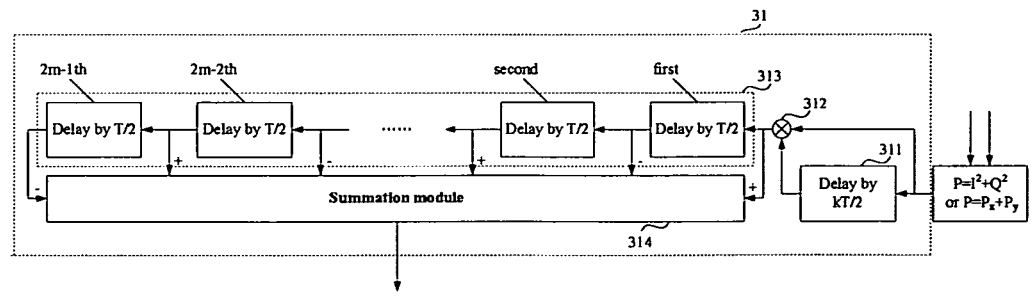
FIG. 3 is a schematic diagram of a phase detector.

An embodiment of the present invention provides a phase detector. FIG. 3 is a schematic diagram of the composition of the phase detector. Referring to FIG. 3, the phase detector comprises:

a calculation unit 31 configured to calculate a phase difference according to a product of receiving power at different moments, so as to perform clock recovery by using the phase difference.

In this embodiment, the receiving power is that obtained in sampling input signals at a predefined sampling rate, the predefined sampling rate being 2 times of a symbol rate.

In an embodiment, the calculation unit 31 may calculate the phase difference according to the formula below:

$$s_{2n} = \sum_{i=0}^{2m-1} (-1)^i P_{2n-i} P_{2n-i-k};$$

where, subscript 2n denotes a serial number of a sampling point, the sampling rate is 2 times of a symbol rate, both n and m are positive integers, and the number of summation items is 2m.

In this case, the value of m may be determined as actually required. When m is relatively large, noise is better suppressed, but the performance in tracking a clock drift is relatively poor and the complexity is relatively high; and when m is relatively small, the performance in tracking a clock drift is relatively good and the complexity is relatively low, but is susceptible to noise. The selection of m in an actual system should be balanced between noise suppression, tracking speed and complexity.

In this case, it can be seen from the above formula that it contains a quadratic item of receiving power. The k in the subscript denotes the relative delay between the two multiplicative receiving power values (k=0, 1, 2 . . . ). The summation operation may be realized by a loop filter. For a Nyquist signal of a spectral width close to the symbol rate, a phase difference may be detected successfully in the manner above, thereby fulfilling clock recovery.

In this embodiment, further referring to FIG. 3, the calculation unit 31 comprises a first delay module 311, a multiplier 312, 2m−1 second delay modules 313 and a summation module 314; wherein, the first delay module 311 is configured to perform first delay to the receiving power;

wherein, for a single-polarization system, the receiving power is $P=I^2+Q^2$; and for a dual-polarization system, the receiving power is $P=P_x+P_y$, $P_x=I_x^2 \pm Q_x^2$, $P_y=I_y^2 \pm Q_y^2$; where, I is a sampling value of an I-th component of a received signal, Q is a sampling value of a Q-th component of the received signal, $P_X$ is the receiving power of the received signal at x polarization state, $P_y$ is the receiving power of the received signal at y polarization state, $I_x$ is a sampling value of the I-th component of the received signal at x polarization state, $Q_X$ is a sampling value of the Q-th component of the received signal at x polarization state, $I_y$ is a sampling value of the I-th component of the received signal at y polarization state, and $Q_y$ is a sampling value of the Q-th component of the received signal at y polarization state.

In this case, the first delay module 311 is configured to delay the receiving power by kT/2. Where, T is a symbol cycle, and as the sampling rate is 2 times of the symbol rate, the delay by kT/2 denotes that k samples are delayed.

The multiplier 312 is configured to multiply the receiving power by the receiving power to which the first delay has been performed by the first delay module 311.

In this case, the current receiving power is one that has not been delayed, and the delayed receiving power is receiving power obtained after being delayed by kT/2. With the multiplier 312 of this embodiment, receiving power at different moments are multiplied by each other.

Each of the second delay modules 313 is configured to perform second delay to the output of the multiplier 312 or the output of a second delay module $313_{i-1}$ preceding the current second delay module $313_i$.

In this case, the calculation unit 31 contains a plurality of second delay modules 313, and the number of them is 2m−1. A second delay module 313 directly connected to the multiplier is used to delay the output of the multiplier 312 by T/2, and a second delay module 313 connected to other second delay modules 313 is used to delay the output of the preceding second delay modules 313 by T/2.

In this case, as the sampling rate is 2 times of the symbol rate, the delay by T/2 by a second delay module denotes that one sample is delayed, T denoting also a symbol cycle.

The summation module 314 is configured to add up the output of the multiplier 312 and the output of each of the second delay modules 313 after being alternatively multiplied by 1 and −1 (taking an inverse number), so as to obtain the phase difference, as shown in FIG. 3.

In this embodiment, the phase difference calculated by the calculation unit 31 according to the embodiment is made to tend toward zero by adjusting the sampling phase of the voltage controlled oscillator (VCO) shown in FIG. 1 or adjusting the delay introduced by the resampler shown in FIG. 2, thereby fulfilling clock recovery.

With the phase detector of this embodiment, the problem that in case of a relatively large frequency difference or line width, or the transmitted signals are Nyquist signals of spectral widths close to the symbol rate, a conventional phase detection method will be invalid, is solved by calculating a phase difference only according to a product of receiving power at different moments.

Embodiment 2

Figure 4:
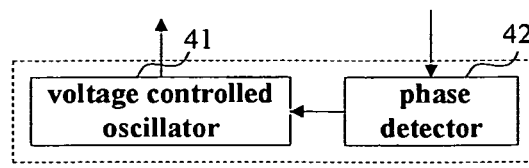
FIG. 4 is a schematic diagram of the composition of a clock recovery apparatus of an embodiment of the present invention.

An embodiment of the present invention provides a clock recovery apparatus. FIG. 4 is a schematic diagram of the composition of the clock recovery apparatus. As shown in FIG. 4, the clock recovery apparatus comprises: a voltage controlled oscillator 41 and a phase detector 42; wherein, the voltage controlled oscillator 41 is configured to drive an analog-digital converter for sampling, and may be realized by a conventional voltage controlled oscillator, the contents of which being incorporated herein, which shall not be described herein any further;

and the phase detector 42 is connected to the voltage controlled oscillator 41 and is configured to detect a phase difference, and may be realized by the phase detector described in Embodiment 1, the contents of which being incorporated herein, which shall not be described herein any further.

With the clock recovery apparatus of this embodiment, the sampling phase of the voltage controlled oscillator is controlled by using the phase difference detected by the phase detector of Embodiment 1, so that the detected phase difference is made to tend toward zero, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

Embodiment 3

Figure 5:
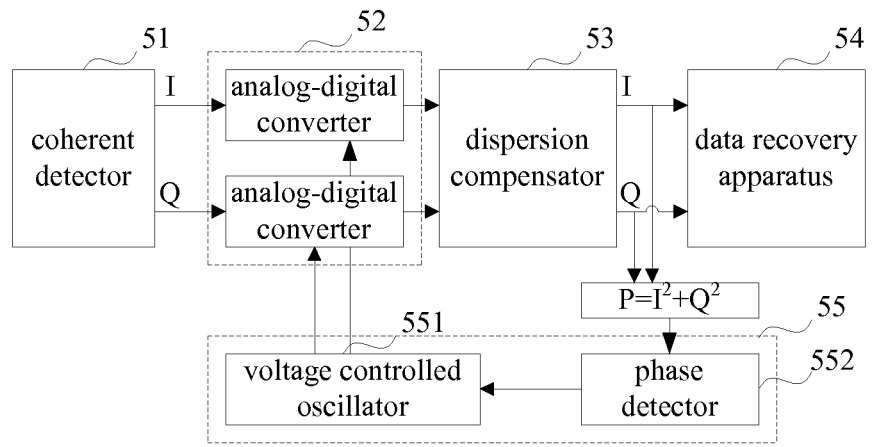
FIG. 5 is a schematic diagram of the composition of a single-polarization coherent receiver using the clock recovery apparatus shown in FIG. 4.

An embodiment of the present invention provides a digital coherent receiver, which is of single polarization. FIG. 5 is a schematic diagram of the composition of the digital coherent receiver. Referring to FIG. 5, the digital coherent receiver comprises: a coherent detector 51, an analog-digital converter 52, a dispersion compensator 53, a data recovery apparatus 54 and a clock recovery apparatus 55; wherein, the coherent detector 51 is configured to convert a received optical signal into an electrical signal; for example, the coherent detector 51 may comprise a local oscillator laser, an optical mixer and an optoelectric detector, and uses the local oscillator laser, the optical mixer and the optoelectric detector to convert a received optical signal into an electrical signal; in this embodiment, the coherent detector 51 may be realized by a conventional coherent detector, the contents of which being incorporated herein, which shall not be described herein any further;

the analog-digital converter 52 is connected to the coherent detector 51 and is configured to perform analog-digital conversion to an I-th component and Q-th component of the received signal outputted by the coherent detector 51;

wherein, the analog-digital converter 52 may be realized by a conventional analog-digital converter, the contents of which being incorporated herein, which shall not be described herein any further;

in particular implementation, there may be two analog-digital converters 52, which perform analog-digital conversion to the I-th component and the Q-th component, respectively, as shown in FIG. 5;

the dispersion compensator 53 is connected to the analog-digital converter 52 and is configured to perform dispersion compensation to the received signal outputted by the analog-digital converter 52;

wherein, the dispersion compensator 53 may be realized by a conventional dispersion compensator, the contents of which being incorporated herein, which shall not be described herein any further;

the data recovery apparatus 54 is connected to the dispersion compensator 53 and is configured to perform data recovery to the received signal to which dispersion compensation has been performed by the dispersion compensator 53;

wherein, the data recovery apparatus 54 may also be realized by a conventional data recovery apparatus, the contents of which being incorporated herein, which shall not be described herein any further;

the clock recovery apparatus 55 comprises a voltage controlled oscillator 551 and a phase detector 552 and is configured to perform clock recovery; wherein, the voltage controlled oscillator 551 of the clock recovery apparatus 55 is further connected to the analog-digital converter 52 and is configured to drive the analog-digital converter 52 for sampling and adjust the sampling phase according to the phase difference detected by the phase detector 552, so that the phase difference is made to tend toward zero; and the phase detector 552 of the clock recovery apparatus 55 is further connected to the dispersion compensator 53 and is configured to detect a phase difference;

wherein, the clock recovery apparatus 55 may be realized by the clock recovery apparatus of Embodiment 2, and its phase detector 552 may be realized by the phase detector of Embodiment 1, the contents of which being incorporated herein, which shall not be described herein any further.

The digital coherent receiver of this embodiment controls the sampling phase of the voltage controlled oscillator by using the phase difference detected by the phase detector of Embodiment 1, so that the detected phase difference is made to tend toward zero, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

Embodiment 4

Figure 6:
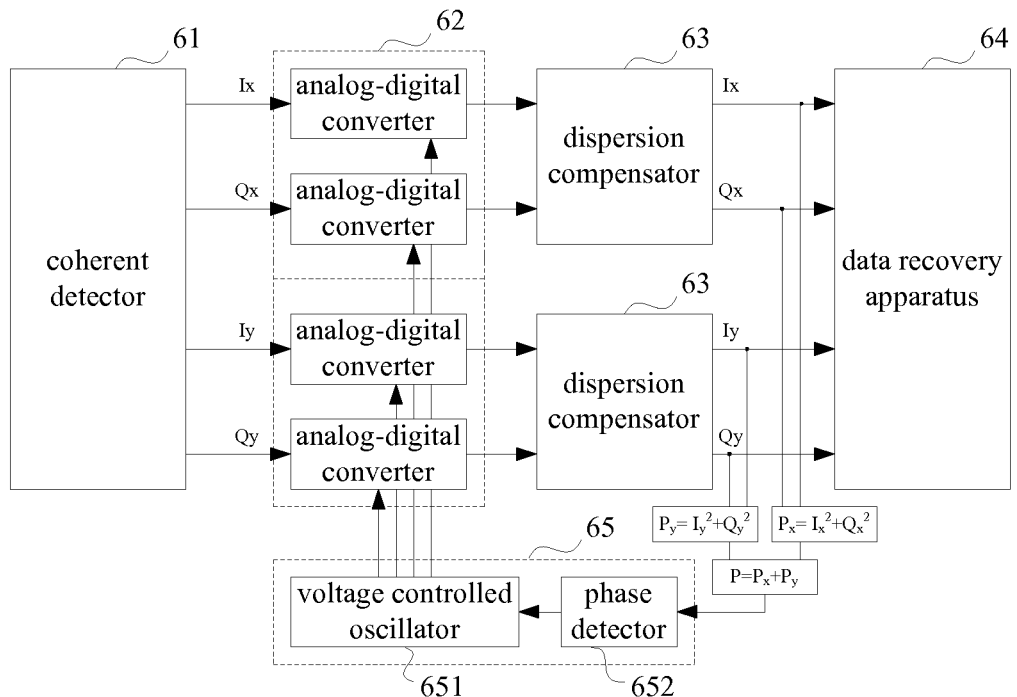
FIG. 6 is a schematic diagram of the composition of a dual-polarization coherent receiver using the clock recovery apparatus shown in FIG. 4.

An embodiment of the present invention provides a digital coherent receiver, which is of dual polarization. FIG. 6 is a schematic diagram of the composition of the digital coherent receiver. Referring to FIG. 6, the digital coherent receiver comprises: a coherent detector 61, an analog-digital converter 62, a dispersion compensator 63, a data recovery apparatus 64 and a clock recovery apparatus 65; wherein, the coherent detector 61 is configured to convert a received optical signal into an electrical signal; for example, the coherent detector 61 may comprise a local oscillator laser, an optical mixer and an optoelectric detector, and uses the local oscillator laser, the optical mixer and the optoelectric detector to convert a received optical signal into an electrical signal; in this embodiment, the coherent detector 61 may be realized by a conventional coherent detector, the contents of which being incorporated herein, which shall not be described herein any further;

the analog-digital converter 62 is connected to the coherent detector 61 and is configured to perform analog-digital conversion to an I-th component and Q-th component of the received signal in the x polarization state and an I-th component and Q-th component of the received signal in the y polarization state, outputted by the coherent detector 61;

wherein, the analog-digital converter 62 may be realized by a conventional analog-digital converter, the contents of which being incorporated herein, which shall not be described herein any further;

in particular implementation, there may be four analog-digital converters 62, which perform analog-digital conversion to an I-th component and Q-th component of the received signal in the x polarization state and an I-th component and Q-th component of the received signal in the y polarization state, respectively, as shown in FIG. 6;

the dispersion compensator 63 is connected to the analog-digital converter 62 and is configured to perform dispersion compensation to the received signal in the x polarization state and the received signal in the y polarization state outputted by the analog-digital converter 62, respectively;

wherein, the dispersion compensator 63 may be realized by a conventional dispersion compensator, the contents of which being incorporated herein, which shall not be described herein any further;

in particular implementation, there may be two dispersion compensators 63, which perform dispersion compensation to the received signal in the x polarization state and the received signal in the y polarization state, respectively, as shown in FIG. 6;

the data recovery apparatus 64 is connected to the dispersion compensator 63 and is configured to perform data recovery to the received signal in the x polarization state and the received signal in the y polarization state to which dispersion compensation has been performed by the dispersion compensator 63;

wherein, the data recovery apparatus 64 may also be realized by a conventional data recovery apparatus, the contents of which being incorporated herein, which shall not be described herein any further;

the clock recovery apparatus 65 comprises a voltage controlled oscillator 651 and a phase detector 652 and is configured to perform clock recovery; wherein, the voltage controlled oscillator 651 of the clock recovery apparatus 65 is further connected to the analog-digital converter 62 and is configured to drive the analog-digital converter 62 for sampling and adjust the sampling phase according to the phase difference detected by the phase detector 652, so that the phase difference is made to tend toward zero; and the phase detector 652 of the clock recovery apparatus 65 is further connected to the dispersion compensator 63 and is configured to detect a phase difference;

wherein, the clock recovery apparatus 65 may be realized by the clock recovery apparatus of Embodiment 2, and its phase detector 652 may be realized by the phase detector of Embodiment 1, the contents of which being incorporated herein, which shall not be described herein any further.

The digital coherent receiver of this embodiment controls the sampling phase of the voltage controlled oscillator by using the phase difference detected by the phase detector of Embodiment 1, so that the detected phase difference is made to tend toward zero, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

Embodiment 5

Figure 7:
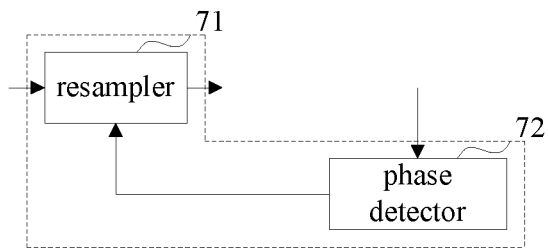
FIG. 7 is a schematic diagram of the composition of a clock recovery apparatus of another embodiment of the present invention.

An embodiment of the present invention further provides a clock recovery apparatus. FIG. 7 is a schematic diagram of the composition of the clock recovery apparatus. Referring to FIG. 7, the clock recovery apparatus comprises: a resampler 71 and a phase detector 72; wherein, the resampler 71 is configured to resample a received signal; the resampler may be realized by a digital filter, which introduces a delay, the magnitude of the delay being decided by the parameters of the filter; and the delay introduced by the resampler may be adjusted by adjusting the parameters of the filter, the contents of which being incorporated herein, which shall not be described herein any further;

and the phase detector 72 is connected to the resampler 71 and is configured to detect a phase difference, which may be realized by the phase detector of Embodiment 1, the contents of which being incorporated herein, which shall not be described herein any further.

With the clock recovery apparatus of this embodiment, the delay introduced by the resampler may be adjusted by using the phase difference detected by the phase detector of Embodiment 1, so that the detected phase difference is made to tend toward zero, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

Embodiment 6

Figure 8:
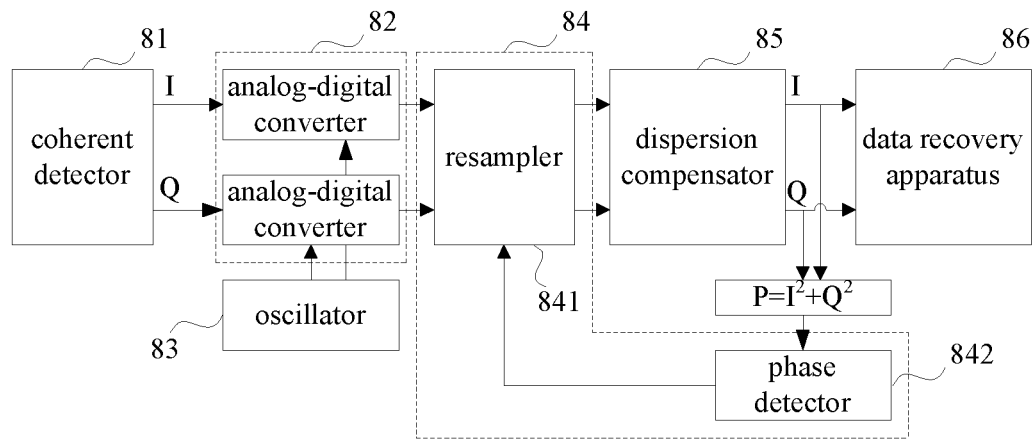
FIG. 8 is a schematic diagram of the composition of a single-polarization coherent receiver using the clock recovery apparatus shown in FIG. 7.

An embodiment of the present invention further provides a digital coherent receiver, which is of single polarization. FIG. 8 is a schematic diagram of the composition of the digital coherent receiver. Referring to FIG. 8, the digital coherent receiver comprises: a coherent detector 81, an analog-digital converter 82, an oscillator 83, a clock recovery apparatus 84, a dispersion compensator 85 and a data recovery apparatus 86; wherein, the coherent detector 81 is configured to convert a received optical signal into an electrical signal; for example, the coherent detector 81 may comprise a local oscillator laser, an optical mixer and an optoelectric detector, and uses the local oscillator laser, the optical mixer and the optoelectric detector to convert a received optical signal into an electrical signal; in this embodiment, the coherent detector 81 may be realized by a conventional coherent detector, the contents of which being incorporated herein, which shall not be described herein any further;

the analog-digital converter 82 is connected to the coherent detector 81 and is configured to perform analog-digital conversion to an I-th component and Q-th component of the received signal outputted by the coherent detector 81;

wherein, the analog-digital converter 82 may be realized by a conventional analog-digital converter, the contents of which being incorporated herein, which shall not be described herein any further;

in particular implementation, there may be two analog-digital converters 82, which perform analog-digital conversion to the I-th component and the Q-th component, respectively, as shown in FIG. 8;

the oscillator 83 is connected to the analog-digital converter 82 and is configured to drive the analog-digital converter 82 for sampling;

wherein, the sampling rate is 2 times of the symbol rate;

wherein, the oscillator 83 may be realized by a conventional oscillator, the contents of which being incorporated herein, which shall not be described herein any further;

the clock recovery apparatus 84 is connected to the analog-digital converter 82 and is configured to perform clock recovery;

wherein, the clock recovery apparatus 84 comprises a resampler 841 and a phase detector 842 and is configured to perform clock recovery; wherein the resampler 841 of the clock recovery apparatus 84 is disposed between the analog-digital converter 82 and the dispersion compensator 85 and is configured to resample a received signal and adjust the delay introduced by the resampler 841 according to the phase difference detected by the phase detector 842, so that the phase difference is made to tend towards zero; and the phase detector 842 of the clock recovery apparatus 84 is further connected to the dispersion compensator 85 and is configured to detect a phase difference;

wherein, the clock recovery apparatus 84 may be realized by the clock recovery apparatus of Embodiment 5, and its phase detector 842 may be realized by the phase detector of Embodiment 1, the contents of which being incorporated herein, which shall not be described herein any further;

the dispersion compensator 85 is connected to the clock recovery apparatus 84 and is configured to perform dispersion compensation to the received signal outputted by the analog-digital converter 82;

wherein, the dispersion compensator 85 may be realized by a conventional dispersion compensator, the contents of which being incorporated herein, which shall not be described herein any further;

and the data recovery apparatus 86 is connected to the dispersion compensator 85 and is configured to perform data recovery to the received signal to which dispersion compensation has been performed by the dispersion compensator 85;

wherein, the data recovery apparatus 86 may also be realized by a conventional data recovery apparatus, the contents of which being incorporated herein, which shall not be described herein any further.

The digital coherent receiver of this embodiment adjusts the delay introduced by the resampler by using the phase difference detected by the phase detector of Embodiment 1, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

Embodiment 7

Figure 9:
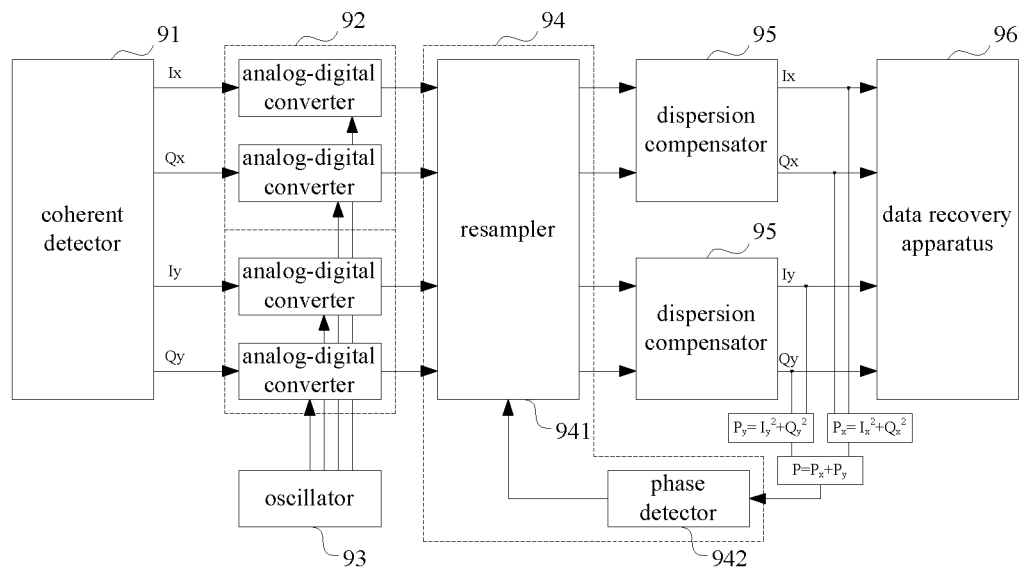
FIG. 9 is a schematic diagram of the composition of a dual-polarization coherent receiver using the clock recovery apparatus shown in FIG. 7.

An embodiment of the present invention further provides a digital coherent receiver, which is of dual polarization. FIG. 9 is a schematic diagram of the composition of the digital coherent receiver. Referring to FIG. 9, the digital coherent receiver comprises: a coherent detector 91, an analog-digital converter 92, an oscillator 93, a clock recovery apparatus 94, a dispersion compensator 95 and a data recovery apparatus 96; wherein, the coherent detector 91 is configured to convert a received optical signal into an electrical signal; for example, the coherent detector 91 may comprise a local oscillator laser, an optical mixer and an optoelectric detector, and uses the local oscillator laser, the optical mixer and the optoelectric detector to convert a received optical signal into an electrical signal; in this embodiment, the coherent detector 91 may be realized by a conventional coherent detector, the contents of which being incorporated herein, which shall not be described herein any further;

the analog-digital converter 92 is connected to the coherent detector 91 and is configured to perform analog-digital conversion to an I-th component and Q-th component of the received signal in the x polarization state and an I-th component and Q-th component of the received signal in the y polarization state, outputted by the coherent detector 91;

wherein, the analog-digital converter 92 may be realized by a conventional analog-digital converter, the contents of which being incorporated herein, which shall not be described herein any further;

in particular implementation, there may be four analog-digital converters 92, which perform analog-digital conversion to the I-th component and the Q-th component in the x polarization state and the I-th component and the Q-th component in the y polarization state, respectively, as shown in FIG. 9;

the oscillator 93 is connected to the analog-digital converter 92 and is configured to drive the analog-digital converter 92 for sampling;

wherein, the sampling rate is 2 times of the symbol rate;

wherein, the oscillator 93 may be realized by a conventional oscillator, the contents of which being incorporated herein, which shall not be described herein any further;

the clock recovery apparatus 94 is connected to the analog-digital converter 92 and is configured to perform clock recovery;

wherein, the clock recovery apparatus 94 comprises a resampler 941 and a phase detector 942 and is configured to perform clock recovery; wherein the resampler 941 of the clock recovery apparatus 94 is disposed between the analog-digital converter 92 and the dispersion compensator 95 and is configured to resample a received signal and adjust the introduced delay according to the phase difference detected by the phase detector 942, so that the phase difference is made to tend towards zero; and the phase detector 942 of the clock recovery apparatus 94 is further connected to the dispersion compensator 95 and is configured to detect a phase difference;

wherein, the clock recovery apparatus 94 may be realized by the clock recovery apparatus of Embodiment 5, and its phase detector 942 may be realized by the phase detector of Embodiment 1, the contents of which being incorporated herein, which shall not be described herein any further;

the dispersion compensator 95 is connected to the clock recovery apparatus 94 and is configured to perform dispersion compensation to the received signal in the x polarization state and the received signal in the y polarization state, outputted by the analog-digital converter 92;

wherein, the dispersion compensator 95 may be realized by a conventional dispersion compensator, the contents of which being incorporated herein, which shall not be described herein any further;

in particular implementation, there may be two dispersion compensators 95, which perform dispersion compensation to the received signal in the x polarization state and the received signal in the y polarization state, respectively, as shown in FIG. 9;

and the data recovery apparatus 96 is connected to the dispersion compensator 95 and is configured to perform data recovery to the received signal in the x polarization state and the received signal in the y polarization state to which dispersion compensation has been performed by the dispersion compensator 95;

wherein, the data recovery apparatus 96 may also be realized by a conventional data recovery apparatus, the contents of which being incorporated herein, which shall not be described herein any further.

The digital coherent receiver of this embodiment adjusts the delay introduced by the resampler by using the phase difference detected by the phase detector of Embodiment 1, thereby achieving clock recovery. Furthermore, as the phase detector calculates a phase difference only according to a product of receiving power at different moments, the problem that in case of a relatively large frequency difference or line width, or the transmitted signals are Nyquist signals of spectral widths close to the symbol rate, a conventional phase detection method will be invalid, is solved.

An embodiment of the present invention further provides a phase detection method for clock recovery, as described in Embodiment 8 below. As the principle of the method for solving problems is similar to that of the phase detector of Embodiment 1, the implementation of Embodiment 1 may be referred to for the implementation of the method, and the repeated parts shall not be described any further.

Embodiment 8

Figure 10:
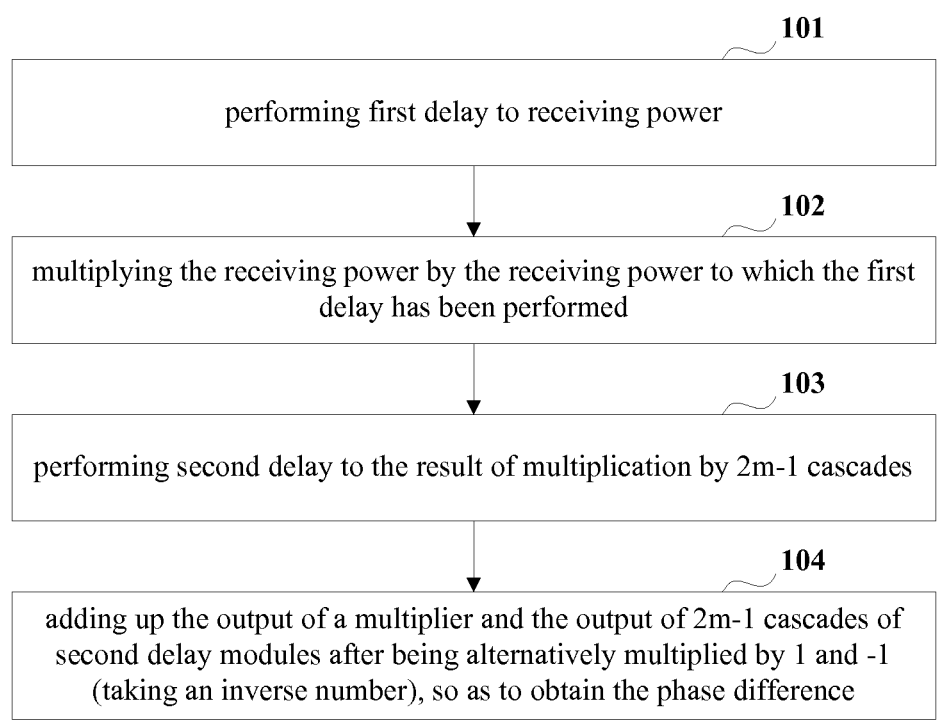
FIG. 10 is a flowchart of a phase detection method of an embodiment of the present invention.

An embodiment of the present invention further provides a phase detection method for clock recovery. FIG. 10 is a flowchart of the method. Referring to FIG. 10, the method comprises:

calculating a phase difference according to a product of receiving power at different moments, so as to perform clock recovery by using the phase difference;

wherein, the receiving power is that obtained in sampling input signals at a predefined sampling rate, the predefined sampling rate being 2 times of a symbol rate.

In an embodiment, the phase difference may be calculated according to the formula below:

$$s_{2n}=\Sigma_{i=0}^{2m-1}(-1)^i P_{2n-i} P_{2n-i-k};$$

where, subscript 2n denotes a serial number of a sampling point, the sampling rate is 2 times of a symbol rate, both n and m are positive integers, the number of summation items is 2m, and k is the relative delay between the two multiplicative receiving power values (k=0, 1, 2 . . . ).

In this case, for a single-polarization system, the receiving power is $P=I^2+Q^2$; and for a dual-polarization system, the receiving power is $P=P_x+P_y$, $P_x=I_x^2+Q_x^2$; $P_y=I_y^2+Q_y^2$; where, I is a sampling value of an I-th component of a received signal, Q is a sampling value of a Q-th component of the received signal, $P_x$ is the receiving power of the received signal at x polarization state, $P_y$ is the receiving power of the received signal at y polarization state, $I_x$ is a sampling value of the I-th component of the received signal at x polarization state, $Q_x$ is a sampling value of the Q-th component of the received signal at x polarization state, $I_y$ is a sampling value of the I-th component of the received signal at y polarization state, and $Q_y$ is a sampling value of the Q-th component of the received signal at y polarization state.

Referring to FIG. 10, the method comprises the steps of:

step 101: performing first delay to receiving power;

wherein, the first delay is kT/2, T being a symbol cycle, and k being the relative delay between the two multiplicative receiving power values;

step 102: multiplying the receiving power by the receiving power to which the first delay has been performed;

step 103: performing second delay to the result of multiplication by 2m−1 cascades;

wherein, the second delay is T/2, T being a symbol cycle;

step 104: adding up the output of a multiplier and the output of 2m−1 cascades of second delay modules after being alternatively multiplied by 1 and −1 (taking an inverse number), so as to obtain the phase difference.

By detecting a phase difference using the method of this embodiment, the problem that in case of a relatively large frequency difference or line width, or the transmitted signals are Nyquist signals of spectral widths close to the symbol rate, a conventional phase detection method will be invalid, is solved.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

For the implementation of the present invention containing the above embodiments, following supplements are further disclosed.

Supplement 1. A phase detection method for clock recovery, comprising:

calculating a phase difference according to a product of receiving power at different moments, so as to perform clock recovery by using the phase difference;

wherein, the receiving power is that obtained in sampling input signals at a predefined sampling rate, the predefined sampling rate being 2 times of a symbol rate.

Supplement 2. The method according to supplement 1, wherein the phase difference may be calculated according to the formula below:

$$s_{2n}=\Sum_{i=0}^{2m-1}(-1)^{i}P_{2n-i}P_{2n-i-k};$$

where, subscript 2n denotes a serial number of a sampling point, the sampling rate is 2 times of a symbol rate, both n and m are positive integers, the number of summation items is 2m, and k is the relative delay between the two multiplicative receiving power values (k=0, 1, 2 . . . ).

Supplement 3. The method according to supplement 1, wherein, for a single-polarization system, the receiving power is $P=I^2+Q^2$; and for a dual-polarization system, the receiving power is $P=P_x+P_y$, $P_x=I_x^2+Q_x^2$, $P_y=I_y^2+Q_y^2$; where, I is a sampling value of an I-th component of a received signal, Q is a sampling value of a Q-th component of the received signal, $P_x$ is the receiving power of the received signal at x polarization state, $P_y$ is the receiving power of the received signal at y polarization state, $I_x$ is a sampling value of the I-th component of the received signal at x polarization state, $Q_x$ is a sampling value of the Q-th component of the received signal at x polarization state, $I_y$ is a sampling value of the I-th component of the received signal at y polarization state, and $Q_y$ is a sampling value of the Q-th component of the received signal at y polarization state.

Supplement 4. The method according to supplement 1, wherein the method comprises the steps of:

S1: performing first delay to receiving power;
wherein, the first delay is kT/2, T being a symbol cycle, and k being the relative delay between the two multiplicative receiving power values;

S2: multiplying the receiving power by the receiving power to which the first delay has been performed;

S3: performing second delay to the result of multiplication by 2m−1 cascades;
wherein, the second delay is T/2, T being a symbol cycle;

S4: adding up the output of a multiplier and the output of 2m−1 cascades of second delay modules after being alternatively multiplied by 1 and −1 (taking an inverse number), so as to obtain the phase difference.

The invention claimed is:

1. A phase detector, comprising:
a calculation unit configured to calculate a phase difference according to a product of receiving power at different moments, so as to perform clock recovery by using the phase difference;
wherein the receiving power is that obtained in sampling input signals at a predefined sampling rate, the predefined sampling rate being 2 times of a symbol rate;
wherein the calculation unit uses the formula below to calculate the phase difference:

$$s_{2n}=\Sum_{i=0}^{2m-1}(-1)^{i}P_{2n-i}P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . .

2. The phase detector according to claim 1, wherein the calculation unit comprises:
a first delay module configured to perform first delay to the receiving power;
a multiplier configured to multiply the receiving power by the receiving power to which the first delay has been performed by the first delay module;
2m−1 second delay modules, each of which being configured to perform second delay to the output of the multiplier or the output of a second delay module preceding the current second delay module; and
a summation module configured to add up the output of the multiplier and the output of each of the second delay modules after being alternatively multiplied by 1 and −1, so as to obtain the phase difference.

3. The phase detector according to any one of claim 1, wherein
for a single-polarization system, the receiving power is $P=I^2+Q^2$;
and for a dual-polarization system, the receiving power is $P=P_x+P_y$, $P_x=I_x^2+Q_x^2$, $P_y=I_y^2+Q_y^2$;
where, I is a sampling value of an I-th component of a received signal, Q is a sampling value of a Q-th component of the received signal, $P_x$ is the receiving power of the received signal at x polarization state, $P_y$ is the receiving power of the received signal at y polarization state, $I_x$ is a sampling value of the I-th component of the received signal at x polarization state, $Q_x$ is a sampling value of the Q-th component of the received signal at x polarization state, $I_y$ is a sampling value of the I-th component of the received signal at y polarization state, and $Q_y$ is a sampling value of the Q-th component of the received signal at y polarization state.

4. A clock recovery apparatus, comprising:
a voltage controlled oscillator configured to drive an analog-digital converter for sampling; and
a phase detector connected to the voltage controlled oscillator and configured to detect a phase difference,
wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate;
wherein the calculation unit uses the formula below to calculate the phase difference:

$$s_{2n}=\Sum_{i=0}^{2m-1}(-1)^{i}P_{2n-i}P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . .

5. A single-polarization digital coherent receiver, comprising:
a coherent detector configured to convert a received optical signal into an electrical signal;
an analog-digital converter connected to the coherent detector and configured to perform analog-digital conversion to an I-th component and Q-th component of the received signal outputted by the coherent detector;
a dispersion compensator connected to the analog-digital converter and configured to perform dispersion compensation to the received signal outputted by the analog-digital converter;
a data recovery apparatus connected to the dispersion compensator and configured to perform data recovery to the received signal to which dispersion compensation has been performed by the dispersion compensator; and a clock recovery apparatus comprising a voltage controlled oscillator and a phase detector, the voltage controlled oscillator is configured to drive an analog-digital converter for sampling, the phase detector is connected to the voltage controlled oscillator and configured to detect a phase difference, wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate, wherein the calculation unit uses the formula below to calculate the phase difference:

$$s_{2n} = \Sigma_{i=0}^{2m-1} (-1)^i P_{2n-i} P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . , wherein the voltage controlled oscillator is further connected to the analog-digital converter and configured to drive the analog-digital converter for sampling, the phase detector is further connected to the dispersion compensator and configured to detect a phase difference, and the clock recovery apparatus being configured to perform clock recovery.

6. A dual-polarization digital coherent receiver, comprising:

a coherent detector configured to convert a received optical signal into an electrical signal;

an analog-digital converter connected to the coherent detector and configured to perform analog-digital conversion to an I-th component and Q-th component of the received signal at x polarization state and the I-th component and Q-th component of the received signal at y polarization state outputted by the coherent detector;

a dispersion compensator connected to the analog-digital converter and configured to perform dispersion compensation respectively to the received signals at x polarization state and y polarization state outputted by the analog-digital converter;

a data recovery apparatus connected to the dispersion compensator and configured to perform data recovery to the received signals at x polarization state and y polarization state to which dispersion compensation has been performed by the dispersion compensator; and a clock recovery apparatus comprising a voltage controlled oscillator and a phase detector, the voltage controlled oscillator is configured to drive an analog-digital converter for sampling, the phase detector is connected to the voltage controlled oscillator and configured to detect a phase difference, wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate, wherein the calculation unit uses the formula below to calculate the phase difference:

$$s_{2n} = \Sigma_{i=0}^{2m-1} (-1)^i P_{2n-i} P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . , wherein the voltage controlled oscillator is further connected to the analog-digital converter, the phase detector is further connected to the dispersion compensator, and the clock recovery apparatus being configured to perform clock recovery.

7. A clock recovery apparatus, comprising:

a resampler configured to resample a received signal; and a phase detector connected to the resampler and configured to detect a phase difference, wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate, wherein the calculation unit uses the formula below to calculate the phase difference:

$$s_{2n} = \Sigma_{i=0}^{2m-1} (-1)^i P_{2n-i} P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . .

8. A single-polarization digital coherent receiver, comprising:

a coherent detector configured to convert a received optical signal into an electrical signal;

an analog-digital converter connected to the coherent detector and configured to perform analog-digital conversion to an I-th component and Q-th component of the received signal outputted by the coherent detector;

an oscillator connected to the analog-digital converter and configured to drive the analog-digital converter for sampling;

a clock recovery apparatus connected to the analog-digital converter and configured to perform clock recovery;

a dispersion compensator connected to the clock recovery apparatus and configured to perform dispersion compensation to the received signal outputted by the analog-digital converter; and a data recovery apparatus connected to the dispersion compensator and configured to perform data recovery to the received signal to which dispersion compensation has been performed by the dispersion compensator;

wherein the clock recovery apparatus comprises a resampler and a phase detector, the resampler is configured to resample a received signal, the phase detector is connected to the resampler and configured to detect a phase difference, wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate, wherein the calculation unit uses the formula below to calculate the phase difference:

$$s_{2n} = \Sigma_{i=0}^{2m-1} (-1)^i P_{2n-i} P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . , wherein the resampler is disposed between the analog-digital converter and the dispersion compensator and configured to resample a received signal, and the phase detector is further connected to the dispersion compensator and configured to detect a phase difference.

9. A dual-polarization digital coherent receiver, comprising:
- a coherent detector configured to convert a received optical signal into an electrical signal;
- an analog-digital converter connected to the coherent detector and configured to perform analog-digital conversion to an I-th component and Q-th component of the received signal at x polarization state and the I-th component and Q-th component of the received signal at y polarization state outputted by the coherent detector;
- an oscillator connected to the analog-digital converter and configured to drive the analog-digital converter for sampling;
- a clock recovery apparatus connected to the analog-digital converter and configured to perform clock recovery;
- a dispersion compensator connected to the clock recovery apparatus and configured to perform dispersion compensation respectively to the received signals at x polarization state and y polarization state outputted by the analog-digital converter; and
- a data recovery apparatus connected to the dispersion compensator and configured to perform data recovery to the received signals at x polarization state and y polarization state to which dispersion compensation has been performed by the dispersion compensator;

wherein the clock recovery apparatus comprises a resampler and a phase detector, the resampler is configured to resample a received signal, the phase detector is connected to the resampler and configured to detect a phase difference, wherein the phase detector comprises a calculation unit which is configured to calculate a phase difference according to a product of receiving power at different moments, so as to perform clock recovery by using the phase difference, wherein the receiving power is that obtained in sampling input signals at a predefined sampling rate, the predefined sampling rate being 2 times of a symbol rate, wherein the calculation unit uses the formula below to calculate the phase difference:

$$s_{2n} = \Sigma_{i=0}^{2m-1} (-1)^i P_{2n-i} P_{2n-i-k};$$

where, s denotes the output of the phase detector, subscript 2n denotes a serial number of a sampling point, the predefined sampling rate is 2 times of a symbol rate, P denotes the receiving power, both n and m are positive integers, the number of summation items is 2m, and k denotes the relative delay between the two multiplicative receiving power values, k=0, 1, 2 . . . , wherein the resampler is disposed between the analog-digital converter and the dispersion compensator and configured to resample a received signal, and the phase detector is further connected to the dispersion compensator and configured to detect a phase difference.

* * * * *